US010982800B2

(12) United States Patent
Beatson

(10) Patent No.: US 10,982,800 B2
(45) Date of Patent: Apr. 20, 2021

(54) PIPE COUPLINGS

(71) Applicant: Flex-Seal Couplings Limited, South Yorkshire (GB)

(72) Inventor: Ben Lawrence Beatson, Swinton (GB)

(73) Assignee: FLEXSEAL GMBH, Eschwege (DE)

(*) Notice: Subject to any disclaimer, the term of this patent is extended or adjusted under 35 U.S.C. 154(b) by 296 days.

(21) Appl. No.: 15/881,098

(22) Filed: Jan. 26, 2018

(65) Prior Publication Data
US 2018/0216760 A1 Aug. 2, 2018

(30) Foreign Application Priority Data
Jan. 27, 2017 (GB) .................................. 1701347.5

(51) Int. Cl.
*F16L 25/14* (2006.01)
*F16L 21/00* (2006.01)
*F16L 21/06* (2006.01)

(52) U.S. Cl.
CPC .......... *F16L 21/005* (2013.01); *F16L 21/065* (2013.01); *F16L 25/14* (2013.01)

(58) Field of Classification Search
CPC ....... F16L 21/005; F16L 25/14; F16L 27/021; F16L 27/107; F16L 27/10; F16L 27/00
USPC ... 285/94, 148.22, 148.23, 148.26, 236, 235
See application file for complete search history.

(56) References Cited

U.S. PATENT DOCUMENTS

| 3,104,898 A * | 9/1963 | MacDonald | F16L 27/1133 285/236 |
| 3,402,946 A * | 9/1968 | Dedian | F16L 21/005 285/236 |
| 3,424,482 A * | 1/1969 | Ligon | F16L 3/12 285/230 |
| 4,101,151 A * | 7/1978 | Ferguson | F16L 21/005 285/236 |
| 4,186,948 A * | 2/1980 | Cronk | F16L 21/005 24/274 R |
| 4,380,348 A * | 4/1983 | Swartz | F16L 25/14 285/236 |

(Continued)

FOREIGN PATENT DOCUMENTS

DE 2109566 A1 9/1972
DE 202010013624 U1 12/2011
(Continued)

*Primary Examiner* — Aaron M Dunwoody
(74) *Attorney, Agent, or Firm* — Dickinson Wright PLLC

(57) ABSTRACT

A pipe coupling comprising an elastomeric sleeve, a support sleeve and adjustable clamping bands is provided. Each band has adjustment means comprising a bolt allowing the bands to provide a secure fit on the ends of the pipes to be coupled. The support sleeve comprises contact sections at either end and a compensation section therebetween. The first contact section of the support sleeve is for fitting around a larger pipe than the second contact section. The second contact portion and the compensation section are comprised of fingers of sheet material defined by axial slots therebetween. The elastomeric sleeve comprises a substantially tubular body and end sections provided at each end of the body. The end sections can be folded back over the outer surface of the body to provide circumferential flaps. Each flap defines a partially enclosed channel within which the contact sections of the support sleeve are provided.

17 Claims, 4 Drawing Sheets

(56) References Cited

U.S. PATENT DOCUMENTS

| | | | | |
|---|---|---|---|---|
| 4,491,350 | A * | 1/1985 | Wolf | F16L 25/14 285/236 |
| 5,039,137 | A * | 8/1991 | Cankovic | F16L 21/005 285/148.26 |
| 5,398,976 | A * | 3/1995 | Webb | F16L 39/00 285/148.23 |
| 5,431,458 | A * | 7/1995 | Schaub | F16L 21/005 285/236 |
| 6,102,446 | A * | 8/2000 | Thomas | F01N 13/1816 24/23 R |
| 2009/0160183 | A1 * | 6/2009 | Felber | F16L 49/02 285/148.26 |
| 2012/0098259 | A1 * | 4/2012 | Sarkisian | F16L 21/065 285/369 |
| 2013/0026753 | A1 | 1/2013 | Flanery | |

FOREIGN PATENT DOCUMENTS

| | | |
|---|---|---|
| DE | 102012101553 A1 | 8/2013 |
| DE | 202014001384 U1 | 4/2014 |
| EP | 2072877 A1 | 6/2009 |
| GB | 1299967 A | 12/1972 |
| GB | 2509798 A | 7/2014 |
| GB | 2523158 A | 8/2015 |
| GB | 2529476 A | 2/2016 |

* cited by examiner

PIPE COUPLINGS

CROSS REFERENCE TO RELATED APPLICATION

This U.S. patent application claims priority to United Kingdom Patent Application Serial No. 1701347.5 filed Jan. 27, 2017, entitled "Improvements In Or Relating To Pipe Couplings," the entire disclosure of the application being considered part of the disclosure of this application, and hereby incorporated by reference.

TECHNICAL FIELD

The present invention relates to pipe couplings. In particular the present invention relates to pipe couplings adapted to connect together pipes having different external diameters.

BACKGROUND

It is often necessary or desirable to couple pipe sections together. If each pipe section has the same diameter or a similar diameter, this can be readily achieved by use of a standard pipe coupling. Such a coupling comprises a tube of resiliently deformable material adapted to fit around the outer diameter of each pipe section and bridge the gap therebetween. A clamping band is provided around each end portion of the coupling. When tightened, the clamping band compresses the coupling against the pipe section thereby securing the coupling to the pipe section and forming a seal. Another common feature is the provision of a shear band around the centre of the coupling to increase resistance to load and shear forces.

Commonly, the two pipe sections have different outer diameters. If this size difference is relatively small, the clamping bands can ensure a reasonably secure seal between the coupling and both pipe sections. If, however, this size difference is relatively large, it may not be possible to form a secure seal by further tightening the clamping bands around the smaller pipe section.

One possible solution is to provide a 'bush' around the end of the smaller pipe section. A bush comprises a strip of resilient material which may be wrapped around the outer diameter of the smaller pipe section. The thickness of the bush is sufficient to enable a coupling which fits the larger pipe section to form a secure seal on the outer surface of the bush. If the bush is tightly applied to the smaller pipe section, this will thereby enable a secure seal between the coupling and the smaller pipe section to be provided.

With such an arrangement, as the difference in external pipe diamantes increases, it is more difficult to provide adequate support from a simple conventional shear band. As such, pipe couplings have been developed wherein an adjustable support sleeve is provided around the elastomeric sleeve. The support sleeve typically comprises a substantially tube like form with a central compensation section adapted to provide shear support and contact sections at each end. The contact sections fit between the elastomeric sleeve and the clamping bands and are adapted by the provision of slots or otherwise to adjust to different pipe diameters.

A particular example of a coupling with an adjustable support sleeve is disclosed in U.S. Pat. No. 4,186,948. This document describes a support sleeve comprising a plurality of plates whereby each plate partially overlaps one neighbouring plate and partially underlies another neighbouring plate and the neighbouring plates are pivotally connected. In one embodiment a plurality of plates are formed from a continuous strip of material, joined at the ends to form a tube. Axial slits are provided to define separate plates. Further internal slits at the end of each axial slit allow an upraised hinge channel to be formed defining the boundary between adjacent plates and allowing overlap in the region of the lateral slits. In this manner, the plate edges between the axial slits provide contact sections which can be overlain by clamping bands. The overlapping edges of the plates enable the contact portions to accommodate different pipe diameters. Additionally, folding of the internal slits to create the channel portions allows the sleeve to flex along a line joining the ends of the channel portions so as to accommodate coupling of different diameter pipes. While this design is relatively effective, it is difficult to manufacture. Furthermore, the slitting and folding necessary in manufacture can weaken the overall structure.

Another example of a coupling with an adjustable support sleeve is disclosed in U.S. Pat. No. 4,380,348. This document describes a support sleeve comprising a raised central section having sloped edges. Projecting from the sloped edges are lateral contact sections, each lateral contact section having a plurality of axial slits extending to the central section. The provision of the lateral slits enables each contact section to accommodate different pipe diameters, while flexing at the sloped edges of the central section enables the central section to accommodate different pipe diameters. While this does provide for more straight forward manufacture than the support sleeve shown in U.S. Pat. No. 4,186,948, there is limited flexibility of the central section and thus there is a limited difference in pipe diameter that can be accommodated.

A further example of a coupling with an adjustable support sleeve is disclosed in EP2072877. This document describes a support sleeve wherein axial slots in the lateral sections are extended into the central section. In this manner, rather than merely flexing at either edge to accommodate different diameter pipes, the central section can expand or contract circumferentially. While this does provide for good performance in accommodating different pipe diameters, extending the slots into the central section necessarily weakens the central section, potentially reducing resistance to shear forces. This can be problematic in view of the change of shape of the central section, which does not readily permit the use of an additional shear band to order to improve support. In order to address these issues, EP2072877 does show that some of the axial slots in the lateral portions are closed at outer edges of the lateral portion. This can help improve the structural stability of the support sleeve as a whole at the expense of flexibility in accommodating a larger range of pipe diameters.

A further issue with each of these prior art couplings is that the clamping bands are fitted directly over the contact sections of the support sleeves. This can cause difficulties in maintaining the necessary grip between the clamping bands and the support sleeve to reliably retain the coupling in position. The situation may be exacerbated where the change in shape of the contact sections causes deformation of the contact sections or requires the overlap of adjacent parts of the contact sections, especially when close to the maximum compensation. One way to reduce this prospect is to provide additional formulations on the exterior surface of the support sleeve to retain the clamping bands in place as shown in EP2072877. This adds to the complexity of manufacture, the amount of material used in constructing the sleeve and the thickness of the coupling overall.

It is therefore an object of the present invention to provide a new pipe coupling that at least partially overcomes or alleviates the above problems.

SUMMARY

According to a first embodiment of the present invention there is provided a pipe coupling comprising: a support sleeve comprising a tube having contact sections at either end and a compensation section therebetween; at least one adjustable clamping band for each contact section; and an elastomeric sleeve comprising a substantially tubular body and circumferential flaps provided at each end of the body, the circumferential flaps overlapping the outer surface of the body to define a partially enclosed channel within which the contact sections of the support sleeve are provided and wherein the adjustable clamping bands are provided around the outer surface of the circumferential flaps.

The present invention therefore provides an adjustable coupling with shear support wherein the clamping bands are more securely retained in position around the support sleeve due to the provision of the circumferential flaps between the clamping bands and the support sleeve.

The elastomeric sleeve may be formed from any suitable material including but not limited to: EPDM (ethylene propylene diene monomer), Silicone, PVC (polyvinylchloride), polyurethane, NBR (nitrile butadiene rubber), SBR (styrene butadiene rubber), Butyl Rubber or the like.

The tubular body may be provided with one or more gripping formations on the inner surface. The gripping formations can help enable a secure connection and/or seal between the coupling and the pipes to be coupled. Preferably, the gripping formations are provided at either end of the tubular body. The gripping formations may be substantially circumferential. In particular, the gripping formations may comprise one or more circumferential ribs. Gripping formations of this form improve sealing performance between the coupling and the exterior of the pipes to be coupled.

The tubular body may be adapted to retain the support sleeve. In particular, the tubular body may comprise a circumferential trench corresponding to the axial extent of the support sleeve. The edges of the trench thus restrict axial movement of the support sleeve. This increases the security of the coupling.

In further embodiments, one or both ends of the tubular body may be provided with bushing means. Suitable bushing means may comprise a sleeve of elastomeric material adapted to within one end of the tubular body. The bushing means may comprise one or more surface formations adapted to correspond to any gripping formations provided on the tubular body. In particular, the bushing means may have matching gripping formations on an inner surface and/or reciprocal formations on an outer surface.

The flaps preferably extend around the full circumference of the body. The opposing edges of each flap may have a substantially matching form. In a preferred embodiment, each flap has a substantially plain opposing edge. In alternative embodiments, each flap may have differing edge forms.

The flaps may be adapted to retain a clamping band. In particular, the flaps may comprise a circumferential trench corresponding to the width of a clamping band. The edges of the trench thus restrict axial movement of the clamping band. This increases the security of the coupling.

The flaps may be of substantially matching thickness. In further embodiments, the flaps may have differing thicknesses. This can help adapt the coupling to be used to couple a larger difference between pipe exteriors.

The flaps may be of substantially matching axial extent. In further embodiments, the flaps may have differing axial extents. This can enable the flaps to be adapted to fit over contact sections of differing axial extent. Preferably, the axial extent of each flap is related to the axial extent of the respective contact section of the support sleeve.

A lubricant may be applied within the partially enclosed channel defined by the circumferential flaps. This helps to ensure that the contact sections are able to move as required to provide compensation for different pipe sizes. Suitable lubricants include but are not limited to: water based lubricants, silicone based lubricants or the like.

The clamping bands may comprise an elongate planar strip for wrapping around the elastomeric sleeve, the strip provided with adjustment means for adjusting the circumference of the wrapped strip. The opposing ends of the wrapped strip may overlap.

The width of the elongate strips comprising the clamping bands may correspond to the axial extent of the contact sections and/or the circumferential flaps.

The clamping bands may be formed from a metal such as steel, aluminium or the like. In alternative embodiments, the clamping bands may be formed from suitable plastic materials.

The adjustment means for adjusting the bands may take any suitable form. For example, the adjustment means may comprise any of: screws, cams, lever devices, hydraulic devices, pneumatic devices, ratchets, threaded bolts, toggles, wedges or the like. In one embodiment, the adjustment means comprises a worm screw operable to engage with grooves or slots provided. In another embodiment, the adjustment means may comprise a bolted clamp.

In some embodiments, the contact sections of the support sleeve may be of substantially equal axial extent. In other embodiments, a first contact section has a greater axial extent than a second contact section. In such embodiments, the first contact section is fitted over the larger of two pipes to be coupled and the second contact section is fitted over the smaller of two pipes to be coupled. The provision of contact sections with different axial extents fitted to different sized pipes as above increases resistance to shear forces as compared with a substantially symmetrical coupling.

The support sleeve may be formed from a metal such as steel, aluminium or the like. In alternative embodiments, the support sleeve may be formed from suitable plastic materials.

The support sleeve may be formed from a sheet material rolled to form a tube. In such embodiments, the respective edges of the sheet material may overlap. In alternative embodiments, the respective edges may be joined. In some embodiments, the support sleeve may be formed from a series of segments jointed at their respective edges.

In a preferred embodiment, the support sleeve may comprise, a first contact section for fitting around a larger pipe than the second contact section, wherein the first contact section is not provided with axial slots and wherein a series of axial slots extend through the second contact section and the compensation section.

The sleeve may be provided with grooves or other adaptations to facilitate bending between the contact sections and the compensation section.

In some embodiments, the axial slots may be of substantially constant width. In other embodiments, the axial slots may vary substantially constantly in width along the slot. Alternatively, the axial slots may be of differing widths in the compensation section and the second contact section. In one embodiment, the axial slots may be of substantially constant width in the compensation section and of varying width in the second contact section.

In another embodiment, the support sleeve may be in the form of a tube comprising a plurality of aligned pairs of axial slots extending from opposing ends of the tube, wherein the tube is provided with a plurality of axial webs extending between the blind ends of each pair of aligned axial slots. Such a support sleeve is described in greater detail in GB2529476.

In a further embodiment, the support sleeve may comprise a fixing sleeve comprising a spring cage which is on either contact section provided with axial slots distributed around its entire circumference and associated with the compensation section, and with said compensation section being connected with said contact sections by lateral bending areas or joints. Such a support sleeve is described in greater detail in EP2072877.

In a still further embodiment, the support sleeve comprises a plurality of plates formed from a continuous strip of material, joined at the ends to form a tube, whereby each plate partially overlaps one neighbouring plate and partially underlies another neighbouring plate, the neighbouring plates being pivotally connected. Axial slits may be provided to define separate plates. Additionally or alternatively, internal slits may be provided at the end of each axial slit. The internal slits allow an upraised hinge channel to be formed defining the boundary between adjacent plates and allowing overlap in the region of the lateral slits. Such a support sleeve is described in greater detail in U.S. Pat. No. 4,186,948.

In yet another embodiment, the support sleeve comprises a continuous strip of material, joined at the ends to form a tube, the strip comprising a raised central section having sloped edges and lateral contact sections projecting from the sloped edges, each lateral contact section having a plurality of axial slits extending to the central section. The provision of the lateral slits enables each contact section to accommodate different pipe diameters, while flexing at the sloped edges of the central section enables the central section to accommodate different pipe diameters. Such a support sleeve is described in greater detail in U.S. Pat. No. 4,380,348.

According to a second aspect of the present invention, there is provided an elastomeric sleeve for use in a pipe coupling provided with a support sleeve comprising a tube having contact sections at either end and a compensation section therebetween, the elastomeric sleeve comprising: a substantially tubular body and substantially tubular end sections provided at each end of the body, each end section being foldable to provide a circumferential flap overlapping the outer surface of the body to define a partially enclosed channel for receiving the contact sections of a support sleeve and wherein the circumferential flap provides an outer surface for engaging with one or more adjustable clamping bands.

The elastomeric sleeve of the second aspect of the present invention may include any or all features of the coupling of the first aspect of the present invention, as desired or as appropriate.

According to a third aspect of the present invention there is provided a method of assembling a pipe coupling comprising a support sleeve comprising a tube having contact sections at either end and a compensation section therebetween; at least one adjustable clamping band for each contact section; and an elastomeric sleeve comprising a substantially tubular body and circumferential flaps provided at each end of the body, the method comprising the steps of: providing an elastomeric sleeve comprising a substantially tubular body and substantially tubular end sections provided at each end of the body; fitting a support sleeve comprising a tube having contact sections at either end and a compensation section therebetween around the tubular body; folding the end sections of the elastomeric sleeve so as to provide circumferential flaps over the contact sections of the support sleeve; and providing at least one adjustable clamping band around each circumferential flap.

The method of the third aspect of the present invention may include any or all features of the coupling of the first aspect of the present invention or the elastomeric sleeve of the second aspect of the present invention, as desired or as appropriate.

The method may include the step of applying lubricant to the channel defined by the circumferential flaps. The lubricant may be applied before or after the support sleeve is fitted.

According to a fourth aspect of the present invention there is provided a support sleeve for a pipe coupling, the support sleeve comprising: a tube having contact sections at either end and a compensation section therebetween, a first contact section for fitting around a larger pipe than the second contact section, wherein the first contact section is not provided with axial slots and wherein a series of axial slots extend through the second contact section and the compensation section.

The support sleeve of the fourth aspect of the present invention may incorporate any or all features of the first three aspects of the present invention, as desired or as appropriate.

BRIEF DESCRIPTION OF THE DRAWINGS

In order that the invention may be more clearly understood one embodiment thereof will now be described, by way of example only, with reference to the accompanying drawings, of which.

DETAILED DESCRIPTION OF EXAMPLE EMBODIMENTS

Figure 1:
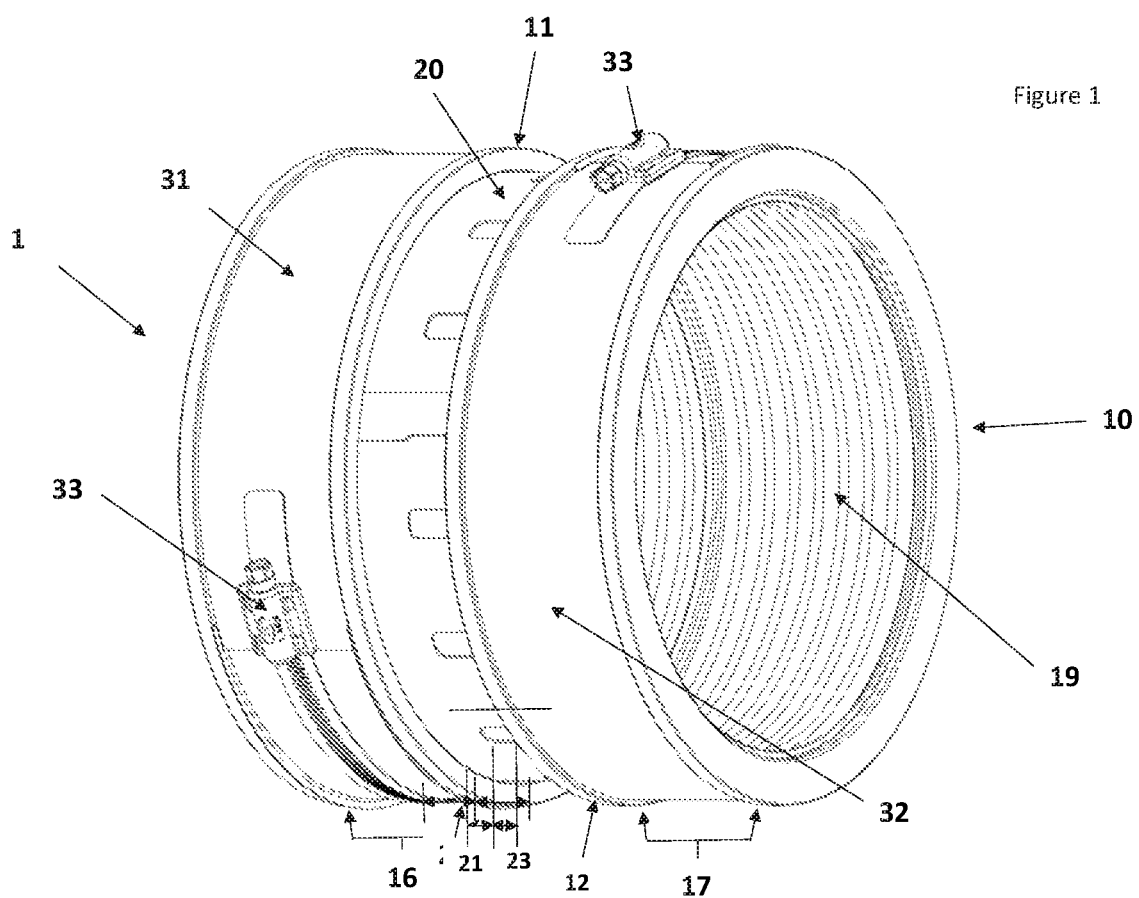
FIG. 1 shows a pipe coupling according to the present invention.

As is shown in FIG. 1, a pipe coupling 1 according to the present invention comprises an elastomeric sleeve 10, a support sleeve 20 and adjustable clamping bands 31, 32.

The adjustable clamping bands comprise a first band 31 which is wider than a second band 32. The end of coupling 1 provided with the first band 31 is adapted to fit over a larger pipe than the other end of the coupling 1. Each band 31, 32 is provided with adjustment means 33 comprising a bolt. The adjustment means 33 allow the clamping bands 31, 32 to be tightened around the respective ends of the coupling 1 to provide a secure fit on the ends of the pipes to be coupled.

Figure 2:
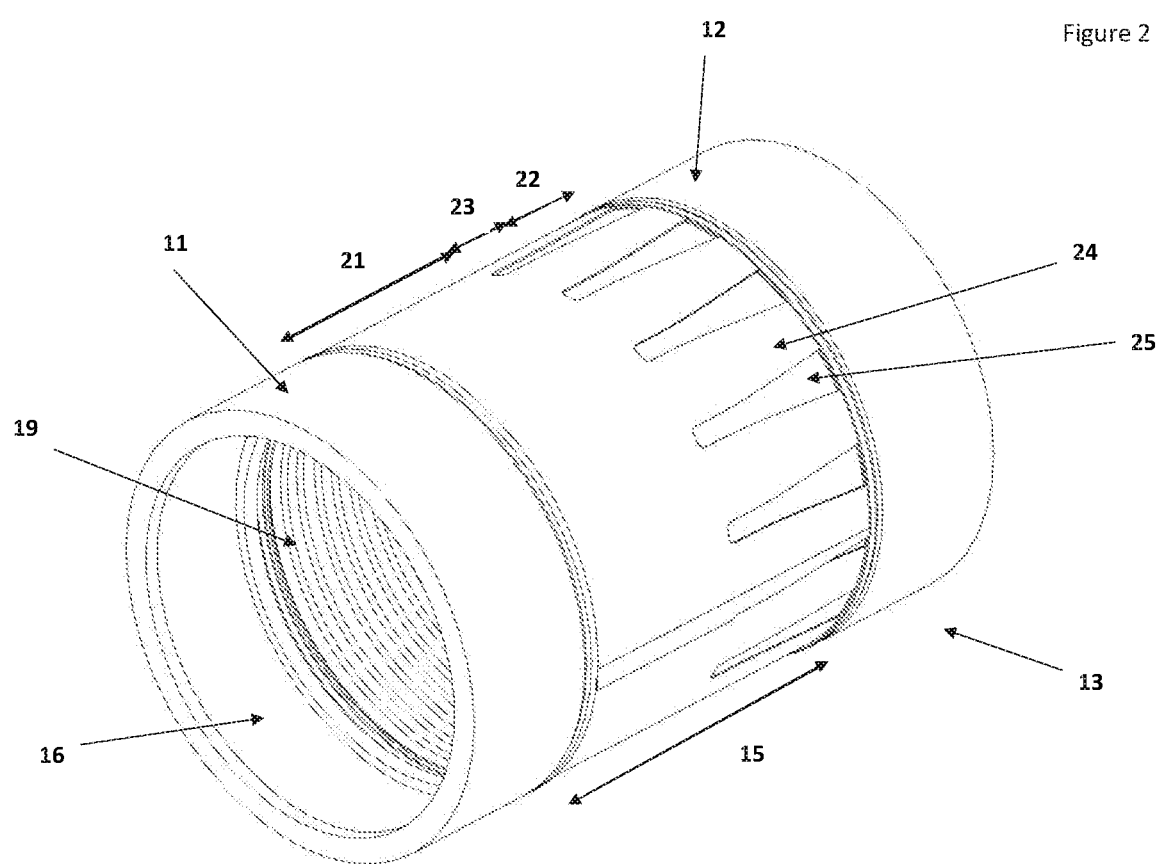
FIG. 2 illustrates a first step in assembling a coupling according to FIG. 1.
Figure 3:
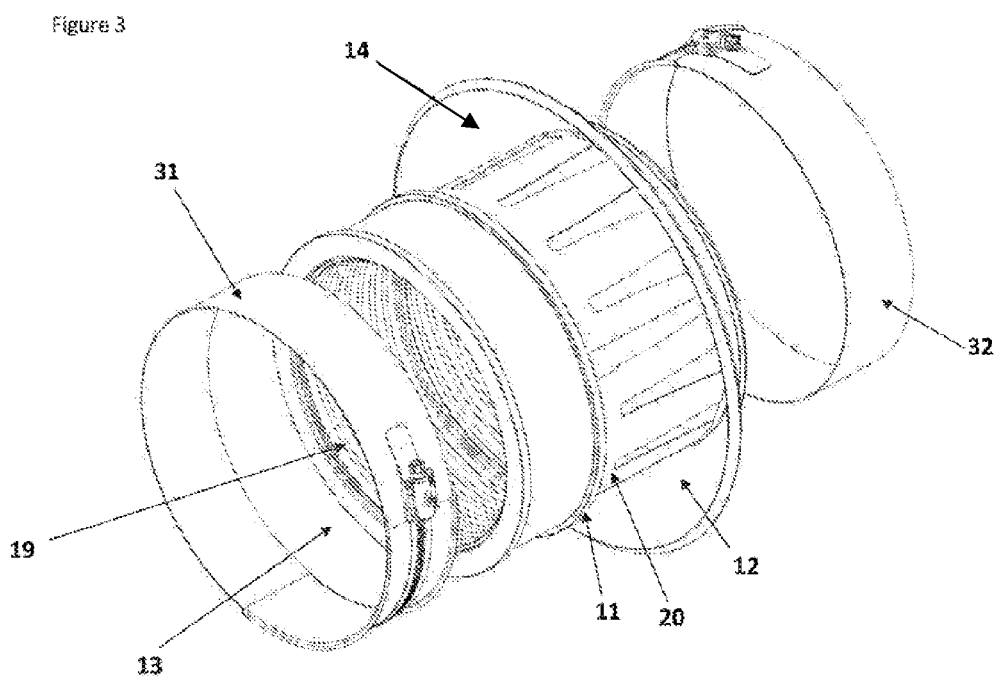
FIG. 3 illustrates a second step in assembling a coupling according to FIG. 1.

Turning now to FIGS. 2 & 3, more details of the elastomeric sleeve 10 and support sleeve 20 are shown. These figures illustrate additionally the assembly of a coupling 1.

The support sleeve 20 comprises contact sections 21, 22 at either end and a compensation section 23 therebetween. The support sleeve 20 is formed from sheet material rolled into a tube. The sheet material is preferably a metal such as rolled aluminium. In some embodiments, the sheet material may be coloured. As is shown in FIG. 2, the respective edges of the sheet material overlap.

The first contact section 21 of the support sleeve 20 is for fitting around a larger pipe than the second contact section 22. Accordingly, the first contact section 21 contains no axial slots and is formed from contiguous sheet material. The second contact portion 22 and the compensation section are comprised of fingers 24 of sheet material, the fingers 24 defined by axial slots 25 therebetween. The axial slots 25 enable the compensation section 23 and the second contact section 22 to deform so as to match the outer diameter of a smaller pipe during coupling.

The axial slots 25 in the embodiment shown have a substantially constant width in the compensation section 23. In the second contact section 22, the axial slots 25 gradually increase in width away from the compensation section 23.

The boundaries between the compensation section 23 and the contact sections 21, 22 may be adapted to facilitate bending along the boundary. This might be achieved by the provision of grooves or other adaptations.

The elastomeric sleeve 10 comprises a substantially tubular body 13 and end sections 11, 12 provided at each end of the body 13. The end sections 11, 12 can be folded back over the outer surface of the body 13 to provide circumferential flaps 11, 12. Each flap 11, 12 defines a partially enclosed channel 14 within which the contact sections 21, 22 of the support sleeve 20 are provided.

The inner surface of the body 13 is provided with gripping formations 19 on the inner surface in the form of circumferential ribs. The gripping formations 19 help enable a secure connection and/or seal between the coupling 1 and the pipes to be coupled.

The outer surface of the body 13 is adapted to retain the support sleeve 20 in position by the provision of a circumferential trench 15 corresponding to the axial extent of the support sleeve 20. The edges of the trench 15 restrict axial movement of the support sleeve 20, thus helping to retain the support sleeve 20 in a desired position.

As can be seen in FIGS. 2 and 3, during assembly the sheet material of the support sleeve 20 is fitted around the elastomeric sleeve 10 within trench 15. The end sections 11, 12 of the elastomeric sleeve 10 can then be folded over the outer surface of the body 13 to provide the circumferential flaps 11, 12. Typically, a lubricant is applied to the end sections 11, 12 and/or the contact section 21, 22 of the support sleeve 20 before folding. This ensures that the support sleeve 20 may still move as necessary within the channels 14 defined by the flaps 11, 12.

After folding, the clamping bands 31, 32 are provided around the outer surface of the circumferential flaps 11, 12. The flaps 11, 12 are adapted to retain the clamping bands 31, 32 by the provision of circumferential trenches 16, 17 corresponding to the width of the respective clamping bands 31, 32. The edges of the trenches 16, 17 restrict axial movement of the clamping bands 31, 32 increasing the security of the coupling 1.

In use, the end of the coupling 1 with the first contact section 21 and the wider clamping band 31 is placed around the larger pipe 6 of two pipes 6, 7 to be coupled together while the end of the coupling 1 with the second contact section 22 and the narrower clamping band 32 is placed around the smaller pipe 7 of the two pipes 6, 7 to be coupled.

Figure 4:
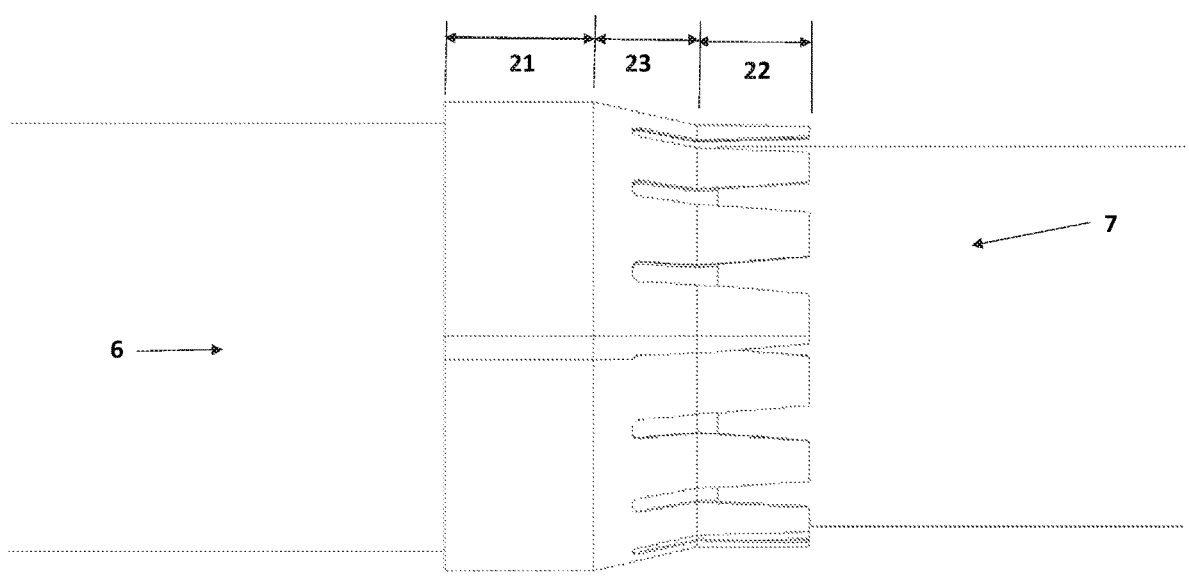
FIG. 4 is a schematic illustration of the deformation of the support sleeve of the coupling of FIG. 1 when used to couple together pipes of differing size.

Once the coupling is in position the respective clamping bands 31, 32 are tightened using adjustment means 33. The resultant deformation of the support sleeve 20 is illustrated in FIG. 4. In this figure, the clamping bands 31, 32 and elastomeric sleeve 10 have been omitted to provide a clearer view of the support sleeve. The support sleeve 20 thus enables the coupling 1 to provide a secure seal on the ends of both pipes 6, 7 and to provide significant support against shear forces.

The first contact section 21 of the support sleeve 20 accommodates tightening by increasing the overlap of the sheet material forming the support sleeve 20. Ultimately, the clamping band 31 presses on circumferential flap 11, contact section 21 and main body 13 so as to produce a seal between the inner surface of the main body 13 and the exterior of pipe 6.

The second contact section 22 accommodates tightening by tangential movement of the fingers 24 to narrow slots 25. There may additionally be some increase in the overlap of the sheet material forming the support sleeve 20. Ultimately, the clamping band 32 presses on circumferential flap 12, contact section 22 and main body 13 so as to produce a seal between the inner surface of the main body 13 and the exterior of pipe 7.

In order to accommodate the differing sizes of the pipes 6, 7, the support sleeve 20 bends at the boundaries between the compensation section 23 and the contact sections 21, 22. Additionally, the compensation section 23 accommodates tightening by tangential movement of the fingers 24 to narrow slots 25. In combination with the bending, this results in the compensation section adopting a truncated cone form.

While the present invention is described in relation to the use of a support sleeve 20 formed from sheet material rolled into a tube, it is also possible that the invention may be adapted such that other forms of support sleeve 20 may be used, including but not limited to support sleeves (or variations thereon) as disclosed in documents such as U.S. Pat. Nos. 4,186,948, 4,380,348, EP2072877 or GB2529476.

The above embodiment is described by way of example only. Many variations are possible without departing from the scope of the invention as defined in the appended claims.

The invention claimed is:

1. A pipe coupling comprising:
   a support sleeve comprising a tube having a first contact section at a first end, a second contact section at a second end, and a compensation section therebetween;
   at least one adjustable clamping band for each contact section; and
   an elastomeric sleeve comprising a substantially tubular body and circumferential flaps provided at each end of the body, the circumferential flaps overlapping the outer surface of the body to define a partially enclosed channel within which the contact sections of the support sleeve are provided, wherein the adjustable clamping bands are provided around the outer surface of the circumferential flaps, and wherein axial slots extend through the compensation section and the second contact section, and the axial slots are of substantially constant width in the compensation section and are of varying width in the second contact section.

2. A pipe coupling as claimed in claim 1 wherein the tubular body is provided with one or more gripping formations on the inner surface.

3. A pipe coupling as claimed in claim 1 wherein the tubular body comprises a circumferential trench corresponding to the axial extent of the support sleeve.

4. A pipe coupling as claimed in claim 1 wherein the flaps extend around the full circumference of the body.

5. A pipe coupling as claimed in claim 1 wherein the flaps comprise a circumferential trench corresponding to the width of a clamping band.

6. A pipe coupling as claimed in claim 1 wherein the flaps are of substantially matching thickness.

7. A pipe coupling as claimed in claim 1 wherein the axial extent of each flap is related to the axial extent of the respective contact section of the support sleeve.

8. A pipe coupling as claimed in claim 1 wherein a lubricant is applied within the partially enclosed channel defined by the circumferential flaps.

9. A pipe coupling as claimed in claim 1 wherein the first contact section of the support sleeve has a greater axial extent than the second contact section.

10. A pipe coupling as claimed in claim 1 wherein the support sleeve is formed from a sheet material rolled to form a tube.

11. A pipe coupling as claimed in claim 10 wherein the support sleeve comprises, the first contact section for fitting around a larger pipe than the second contact section, and wherein the first contact section is not provided with axial slots.

12. A pipe coupling as claimed in claim 1 wherein the support sleeve is in the form of a tube comprising a plurality of aligned pairs of axial slots extending from opposing ends of the tube, wherein the tube is provided with a plurality of axial webs extending between the blind ends of each pair of aligned axial slots.

13. A pipe coupling as claimed in claim 1 wherein the support sleeve comprises a fixing sleeve comprising a spring cage which is on either contact section provided with axial slots distributed around its entire circumference and associated with the compensation section, and with said compensation section being connected with said contact sections by lateral bending areas or joints.

14. A pipe coupling as claimed in claim 1 wherein the support sleeve comprises a plurality of plates formed from a continuous strip of material, joined at the ends to form a tube, whereby each plate partially overlaps one neighbouring plate and partially underlies another neighbouring plate, the neighbouring plates being pivotally connected.

15. A pipe coupling as claimed in claim 1 wherein the support sleeve comprises a continuous strip of material, joined at the ends to form a tube, the strip comprising a raised central section having sloped edges and the contact sections projecting from the sloped edges, each contact section having a plurality of axial slits extending to the central section.

16. A method of assembling a pipe coupling comprising:
a support sleeve comprising a tube having a first contact section at a first end, a second contact section at a second end, and a compensation section therebetween; wherein axial slots extend through the compensation section and the second contact section, and the axial slots are of substantially constant width in the compensation section and are of varying width in the second contact section;
at least one adjustable clamping band for each contact section; and
an elastomeric sleeve comprising a substantially tubular body and circumferential flaps provided at each end of the body, the method comprising the steps of:
providing the elastomeric sleeve comprising the substantially tubular body and substantially tubular end sections provided at each end of the body;
fitting the support sleeve comprising the tube having the first contact section at the first end, the second contact section at the second end, and the compensation section therebetween around the tubular body, wherein the axial slots extend through the compensation section and the second contact section, and the axial slots are of substantially constant width in the compensation section and are of varying width in the second contact section;
folding the end sections of the elastomeric sleeve so as to provide the circumferential flaps over the contact sections of the support sleeve; and
providing the at least one adjustable clamping band around each circumferential flap.

17. A method as claimed in claim 16 wherein the method includes the step of applying lubricant to the channel defined by the circumferential flaps.

\* \* \* \* \*